Patented Apr. 27, 1926.

1,582,157

UNITED STATES PATENT OFFICE.

JOHN W. BECKMAN, OF OAKLAND, CALIFORNIA, ASSIGNOR TO BECKMAN-LINDEN ENGINEERING CORPORATION, OF SAN FRANCISCO, CALIFORNIA, A CORPORATION OF NEVADA.

METHOD OF REDUCING METALLIC SULPHIDES.

No Drawing. Application filed May 22, 1922. Serial No. 562,820.

*To all whom it may concern:*

Be it known that I, JOHN W. BECKMAN, a citizen of the United States, and resident of the city of Oakland, county of Alameda, State of California, have invented new and useful Improvements in Methods of Reducing Metallic Sulphides, of which the following is a specification.

My invention has for its object the reduction of metallic sulphides to recover the metal constituents by separating the sulphur therefrom and during the said process retaining the sulphur in the slag, thereby preventing its dispersion in deleterious fumes.

I have found that ores or concentrates containing metallic sulphides can be treated to reduce them at high temperature in an electric or other closed bottom furnace by using suitable fluxing and reducing materials, including lime and coke or other carbon constituent, whereby the separation of the metal from the sulphur is effected. The metal then flows to the bottom of the furnace, the sulphur being taken up by the lime and retained in the slag as calcium sulphide; thus entirely preventing the escape of sulphur fumes during the process.

As an example, copper sulphide may be treated by my process as follows:

A charge is made up which contains copper sulphide, calcium oxide or lime and carbon or coke, which, when reduced in an electric furnace at a temperature above 2000 degrees centigrade reacts to form calcium sulphide, copper oxide and the carbon thence to metallic copper and carbonic oxide.

As a specific example of my process I have taken concentrates of the following analysis:

|  | Per cent. |
|---|---|
| Copper sulphide | 47.65 |
| Silica | 25.6 |
| Iron | 14.7 |
| Aluminum | 10. |
| Calcium oxide | 1.4 |
| Gold and silver, etc. | .65 |

The iron occurs as iron oxide and assists in forming a fluid slag. A suitable additional amount of calcium oxide lime is added forming a calcium-aluminum-iron silicate, and also sufficient for combining with the sulphur of the copper sulphide, to form a calcium sulphide.

In the above example five parts of lime and five parts of concentrates are mixed with one part of high grade coke or other carbon ingredient, such as charcoal or a suitable bituminous coal.

This mixture or charge is submitted to a high temperature preferably in an electric furnace, whereby a chemical reaction takes place by which the sulphur is converted into calcium sulphide and remains as such in fluid slags, and metallic copper containing also the gold and silver values, and entirely separated from the sulphur sinks to the bottom.

From time to time the furnace is tapped withdrawing the molten metal and slag.

The heating of the above mixture is preferably carried out in an electric furnace whereby the charge is prevented from air action, the furnace being closed on the bottom there can be no air circulation through the mixture as in reverberatory furnaces and which would result in chemical action on the coke or other carbon constituent. The charge in the furnace is preferably around and well above the terminal of an electrode, whereby the upper portions of the charge in the furnace are not exposed to the high temperatures in the neighborhood of the highly heated zones. In this way the upper portions of the charge act to condense any highly volatile vapors which may have remained uncombined or may have been freed in the highly heated zone, and are subsequently again brought into the furnace as the charge works down.

It is also to be noted that although we have described the use of calcium oxide or lime as the constituent by which the sulphur is to react to form a sulphide, there are other substances which may be employed, as for example, magnesium oxide, sodium oxide, etc., and other substances may be employed which under the heat treatment will be converted into basic oxides and as such basic oxides will react with the sulphur to form a sulphide; for example, sodium carbonate if employed in the mixture in the proper molecular equivalent proportions will under the heat of the furnace be converted into sodium oxide which is then a base with which the sulphur will react and form a sodium sulphide; calcium carbonate would also be transformed under the furnace heat to calcium oxide and would react with the sulphur to form calcium sulphide.

It will be noted that in the practicing of my process the earthy oxide as lime, is employed as a reagent to combine with the liberated sulphur and that in addition thereto flux forming constituents are used to effect the reduction of the ore and the collection of the reduced metal which would not otherwise be obtainable without additional process steps. Where the ore to be treated contains the requisite amount of earthy oxide as lime to serve as a reagent for combining with the sulphur, other fluxing materials must be added, as lime, iron oxide or silica according to conventional practice. If the ore originally contained an excess of lime beyond that necessary to combine with the released sulphur, the said excess is to be considered as a fluxing constituent. To those skilled in the art it will now be apparent that the necessary alkali-earth-oxide for combining with the sulphur to be released is to form one of the constituents of the mixture to be charged into the furnace, and that in addition thereto this mixture is to contain proper fluxing materials, the selection of which will depend upon the character and analysis of the ore, and will with the above description be understood by metallurgists. And when the complete mixture is made up with its sulphur combining reagent and fluxing materials as above described, the sulphur will be retained in the slag formed during the treatment as a sulphide of an alkali earthen metal, and the reduced metal from which the sulphur has been released settles through the molten flux and collects in the bottom of the furnace or is tapped off as required as a single body of the original metal.

I claim:

1. The process of reducing metallic sulphide ores which consists of mixing the said ore with lime and coke and a fluxing constituent and heating the said mixture to separate the metal from the sulphur and cause the sulphur to react with the lime to form calcium sulphide which is then retained in the slag and during said heating excluding air from passing through the mixture.

2. The process as set forth in claim 1 wherein the heating is effected in a substantially closed furnace.

3. The process as set forth in claim 1 wherein the said heating is effected in an electric furnace and wherein the said mixture is charged to a substantial depth above the highly heated zone.

4. The process of reducing metallic sulphides which consists of forming a charge of said sulphides with a basic oxide and a carbon constituent and a flux, then heating the charge to form a sulphide with the base and to reduce the metallic constituent.

5. The process as set forth in claim 4 wherein the heating is effected in a substantially closed furnace.

6. The process as set forth in claim 4 wherein the said heating is effected in an electric furnace and wherein the said mixture is charged to a substantial depth above the highly heated zone.

7. The process of reducing metallic sulphides which consists of forming a charge of said sulphides with an oxygen bearing salt of an earthy metal in excess of that which combines with the sulphur which will react during the heating step to produce a basic oxide and a carbon constituent and a flux, then heating the charge to form a sulphide with the base and to reduce the metallic constituent.

8. The process as set forth in claim 7 wherein the heating is effected in a substantially closed furnace.

9. The process as set forth in claim 7 wherein the said heating is effected in an electric furnace and wherein the said mixture is charged to a substantial depth above the highly heated zone.

10. The process of reducing metallic sulphides which consists of forming a charge of said sulphides with an alkali earth metal oxide and a carbon constituent and a flux, then heating the charge to form a sulphide with the base and to reduce the metallic constituent.

11. The process as set forth in claim 10 wherein the heating is effected in a substantially closed furnace.

12. The process as set forth in claim 10 wherein the said heating is effected in an electric furnace and wherein the said mixture is charged to a substantial depth above the highly heated zone.

JOHN W. BECKMAN.